United States Patent

Andersson et al.

[15] 3,647,548

[45] Mar. 7, 1972

[54] METHOD AND APPARATUS FOR ELECTRODE CONVERSION

[72] Inventors: John Lennart Andersson, Ytterby; Ove Karl-Gustav Nilsson, Nol, both of Sweden

[73] Assignee: Aktiebolaget Tudor, Stockholm, Sweden

[22] Filed: Mar. 5, 1970

[21] Appl. No.: 16,738

[52] U.S. Cl. ................................. 136/82, 136/27, 136/76, 136/163, 136/166
[51] Int. Cl. ...................................................... H01m 35/18
[58] Field of Search ............... 136/26, 27, 82, 76, 75, 166, 136/163, 34, 176; 339/114–116

[56] References Cited

UNITED STATES PATENTS

| | | | |
|---|---|---|---|
| 2,036,878 | 4/1936 | Lilenfeld | 136/76 |
| 3,090,823 | 5/1963 | Roach | 136/82 |
| 3,166,447 | 1/1965 | Bronstert et al. | 136/82 |

Primary Examiner—Winston A. Douglas
Assistant Examiner—C. F. Lefevour
Attorney—Burns, Doane, Benedict, Swecker & Mathis

[57] ABSTRACT

Method and apparatus for passing a current of gas over the electrical contact between a conductor of direct current and the material to be electrochemically converted into an electrode for a lead-acid storage battery, the electrical contact being out of contact with the electrolyte.

9 Claims, 6 Drawing Figures

PATENTED MAR 7 1972　　3,647,548

INVENTORS
JOHN L. ANDERSSON
OVE K. NILSSON

BY Burns, Doane, Benedict,
Swecker & Mathis  ATTORNEYS

METHOD AND APPARATUS FOR ELECTRODE CONVERSION

BACKGROUND OF THE INVENTION

Lead storage battery electrodes often consist of a grid or framework of lead or lead alloy in which is placed a so-called active mass consisting predominantly of lead compounds with the valences 0 or +2. After the active mass has been placed in the grid, the electrode is subjected to a treatment that to a certain extent depends on which type of electrode is involved. The purpose of this treatment is to build up a particular structure in the metal compounds. The treatment influences the result of the subsequent process, i.e., the electrochemical conversion of the above-mentioned compounds with the valences 0 and +2 into lead compounds with the valence +4 in the positive electrodes and 0 in the negative electrodes.

It is well known, with respect to all lead battery electrodes and independent of the treatment to which they have been subjected, that current must be supplied to the conductive grid of the electrode for the electrochemical conversion to take place.

A usual procedure in the course of the forming of positive and negative electrodes, is to place the electrodes immediately after such treatment as that mentioned above either separately or several together in slots in a formation vessel. Every other such slot in the formation vessel is provided with electrodes that are to be positive electrodes. After electrolyte, e.g., sulfuric acid of suitable concentration, has been introduced into the vessel and after the electrodes have been connected with a DC source, the formation starts.

Usually the electrodes are connected by soldering to the conductors from the current source. The conductors in turn advantageously consist of lead strips. The electrodes on which the divalent lead compounds are to be reduced through the formation to metallic lead do not normally have to be soldered, but sufficient contact with the current conductor is obtained if these electrodes are made to rest against the latter. It is on the other hand customary for the positive electrodes to be joined by soldering to the conductor to ensure that contact will be maintained during the entire forming period. A considerable simplification in the forming of these electrodes could, therefore, be achieved if this soldering were eliminated.

It is accordingly an object of the present invention to provide a forming method in which the electrodes, especially the positive ones, are joined to the current conductors without soldering.

It is another object of the present invention to provide a method characterized in that air or another gas is blown around the point of contact between the electrode and conductor.

By the electrochemical oxidation during the formation process not only the lead compounds that are in direct contact with the grid in the electrode that is to be the positive one is converted into lead dioxide, but also the surface of the grid itself is converted to lead dioxide. The lead dioxide that develops on the grid is electrically nonconductive and the lead dioxide layer is porous and has a greater volume than the amount of lead from which it was formed. As a consequence of this, every attempt to obtain contact between electrode and current conductor by means of a relatively moderate mechanical pressure is doomed to failure. Even if the contact between the lead surfaces that constitute the electrode grid on the one hand and the conductor on the other hand was good at the beginning of the formation, the contact deteriorates gradually as the formation of the electrode progresses finally to be entirely interrupted.

It can be imagined that the point or region of contact between the grid and the current conductor be moved to above the level of the electrolyte in the formation vessel, but if the distance between the electrolyte level and the region of contact is not very great, the development of a lead dioxide layer between conductor and electrode grid cannot be prevented. The reason for this is that the lug and the point of contact and the conductor become coated with a film of sulfuric acid, partly because the acid creeps up along the surfaces and contact point. The contact point, with the formation methods hitherto used, has been generally covered after the formation with a dioxide layer which had to be removed prior to the joining by brushing with a metal brush or by other abrasion. Since no oxidation of the contact point occurs with the method of the present invention, the entire cleaning operation may be avoided.

Yet another object of the present invention is to eliminate the necessity for abrading the contact points of the electrodes after formation to remove the nonconductive lead dioxide. This is accomplished by preventing the electrolyte from reaching the point of contact by blowing air or another gas about the point of contact and thus preventing the development of an electrolyte film that makes surface leakage currents possible.

These and other objects and advantages will be readily apparent to one skilled in the art from the claims and from the following detailed description when read in conjunction with the appended drawings.

THE DRAWINGS

THE DETAILED DESCRIPTION

Figure 1:
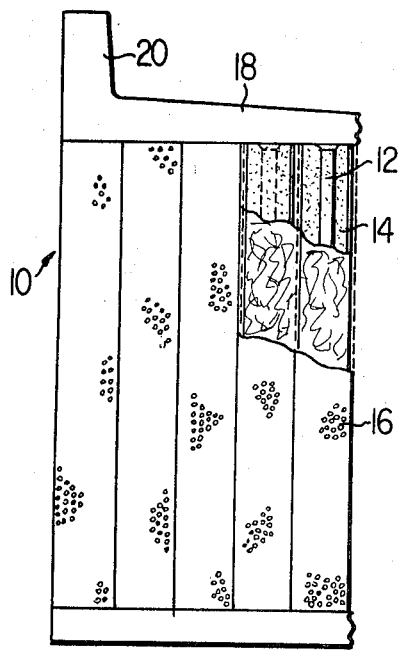
FIG. 1 is a finished electrode in elevation having a portion broken away to show the construction of the upper transverse bar and depending rods.

With reference to the drawings, a finished electrode 10 is illustrated having a plurality of rods 12 surrounded by active material 14 and an electrolyte pervious sheath 16. Each of the rods 12 are connected by means of an arm 18 to a lug 20.

Figure 2:
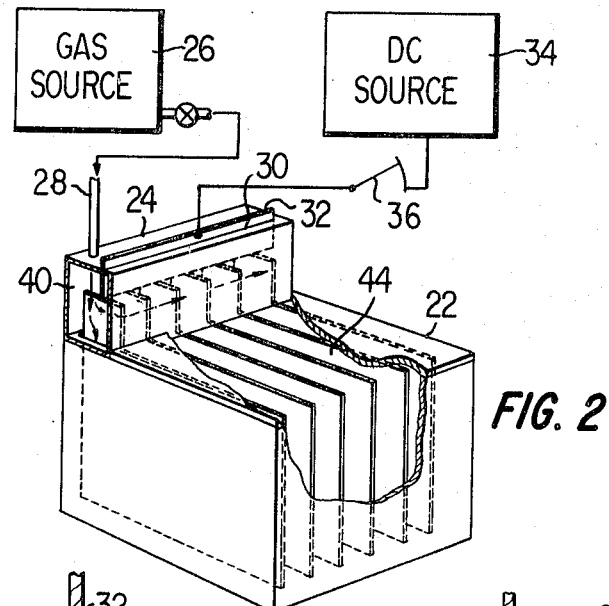
FIG. 2 is a pictorial view of one embodiment of the formation vessel with a portion thereof broken away.

The formation vessel of the present invention is illustrated in FIG. 2 as comprising an electrolyte impervious vessel 22 and lid 24. A gas source 26 is shown connected through a conventional conduit 28 to one end of the lid 24.

The lid 24 is provided with an elongated aperture 30 through which an elongated conductor 32 may be lowered into contact with the lugs of a plurality of electrodes within the vessel. The conductor may be connected to any suitable source of direct current 34 by way of switch 36.

Figure 4:
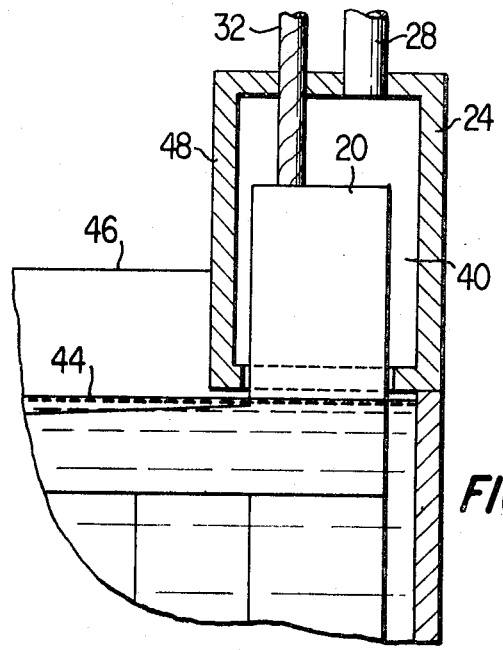
FIG. 4 is a partial section taken through lines 4—4 of FIG. 3 showing the lid of the second embodiment of the formation vessel in place on the electrode.

FIG. 4 shows a portion of the electrode 10. The gas duct 40 which surrounds the lug 20 of electrode 10 communicates with the gas conduit 28 which supplies air or gas. The upper edge of the formation vessel 22 is indicated at 46 and the electrolyte level by a broken line 44.

Figure 3:
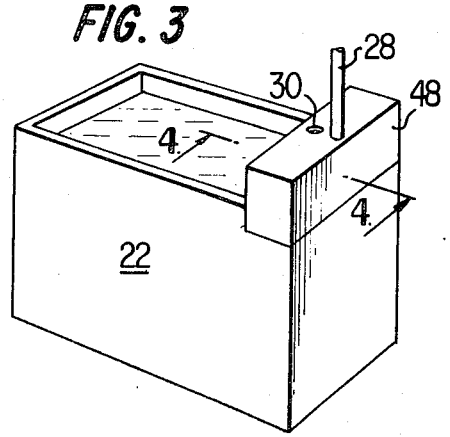
FIG. 3 is a pictorial view of a second embodiment of the formation vessel.

The lid 24 may be hinged or otherwise removably secured to the vessel as in the embodiment illustrated in FIGS. 2 and 3 to cover the entire vessel, or, as illustrated in FIG. 3, the vessel may be open except for the lid covering the lugs 20 of the electrodes disposed therein.

As is seen from FIGS. 2 and 4, the lid may constitute only an outer envelope. The lid may, however, internally contain the ducts for the gas from source 36 as is shown in FIGS. 5 and 6.

Figure 5:
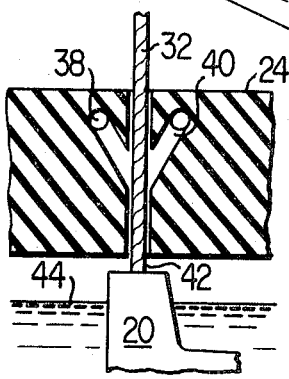
FIG. 5 is a transverse section taken through a third embodiment of the lid of the formation vessel.
Figure 6:
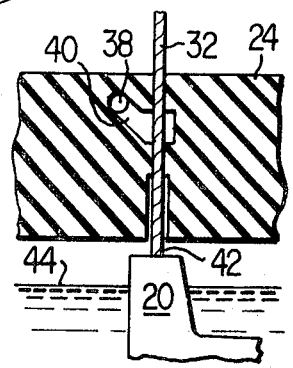
FIG. 6 is a transverse section taken through a fourth embodiment of the lid of the formation vessel.

With reference to FIGS. 5 and 6, the lid 24 is of nonconductive material which may cover the formation vessel. In the lid 24 there may be disposed air or gas ducts 38 and the gas conveyed via the ducts 38 and branch ducts 40 to the point of contact 42 between the conductor 32 and the lug 20. The air ducts 38 and 40 can be designed in many ways.

Through the method of the present invention, a further advantage in the formation technique is thus obtained in connection with the subsequent soldering together or fusing of several electrodes of the same polarity into one electrode group. The connecting point of the electrodes, the so-called contact lug, may also be the contact point for the formation process as illustrated.

We claim:
1. The method for forming electrodes for lead acid storage batteries comprising the steps of:
    a. providing a formation vessel;
    b. placing electrode forming material into a slot in the formation vessel;
    c. introducing an electrolyte into the vessel;
    d. electrically connecting the material to a source of direct current; and
    e. exposing the region of contact between the conductor of direct current and the electrode material to a current of gas.
2. The method of claim 1 wherein the level of the electrolyte in the vessel is below the region of contact between the conductor and the electrode.
3. The method of claim 1 wherein the gas is conveyed to the point of contact through ducts in the lid of the formation vessel.
4. The method of claim 1 wherein the formation vessel has a plurality of slots and including the steps of placing like polarity electrode forming material into alternative of the slots.
5. Apparatus comprising:
    a formation vessel for receiving material to be formed into an electrode for a lead-acid storage battery and an electrolyte;
    a lid for said forming vessel, said lid having a generally vertical aperture;
    a source of direct current;
    conductor means electrically connected to a source and further adapted to be inserted through said aperture into pressural engagement with said electrode; and
    duct means communicating with a gas source and said aperture whereby gas from said gas source may be directed at the region of engagement between said electrode and said conductor means.
6. The apparatus of claim 5 wherein said duct means includes a channel disposed interiorly of said lid.
7. The apparatus of claim 5 wherein said point of engagement is above the level of the electrolyte.
8. The apparatus of claim 5 wherein said vessel has a plurality of slots alternatively receiving material to be formed into positive and negative electrodes,
    wherein said conductor means includes means for engaging the material in each of said slots, and
    wherein said duct means includes means for simultaneously directing gas at the point of engagement between said conductor means and the material in each of said slots.
9. The apparatus of claim 8 wherein said duct means includes a passage disposed interiorally of said lid and
    wherein point of engagement of said conductor means with the material in each of said slots is above the level of the electrolyte.

* * * * *